(12) United States Patent
Kuffner, Jr.

(10) Patent No.: US 11,597,285 B2
(45) Date of Patent: Mar. 7, 2023

(54) SYSTEMS, DEVICES, AND METHODS FOR SHARING PERSONAL MOBILITY DEVICES

(71) Applicant: Toyota Jidosha Kabushiki Kaisha, Toyota (JP)

(72) Inventor: James J. Kuffner, Jr., Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 499 days.

(21) Appl. No.: 16/811,410

(22) Filed: Mar. 6, 2020

(65) Prior Publication Data

US 2021/0278842 A1    Sep. 9, 2021

(51) Int. Cl.
| | |
|---|---|
| *B60L 53/10* | (2019.01) |
| *G07C 9/38* | (2020.01) |
| *G06Q 10/08* | (2012.01) |
| *H02J 7/00* | (2006.01) |
| *G06Q 50/30* | (2012.01) |
| *G06Q 50/06* | (2012.01) |
| *G06Q 50/26* | (2012.01) |
| *G07C 5/08* | (2006.01) |
| *G06Q 10/087* | (2023.01) |

(52) U.S. Cl.
CPC ............ *B60L 53/10* (2019.02); *G06Q 10/087* (2013.01); *G06Q 50/06* (2013.01); *G06Q 50/265* (2013.01); *G06Q 50/30* (2013.01); *G07C 5/08* (2013.01); *G07C 9/38* (2020.01); *H02J 7/007* (2013.01)

(58) Field of Classification Search
CPC ...... B60L 53/10; G06Q 10/087; G06Q 50/06; G06Q 50/265; G06Q 50/30; G07C 5/08; G07C 9/38; G07C 9/00571; G07C 9/00896; H02J 7/007; H02J 2310/48; H02J 7/00034; H02J 7/0044; Y02T 10/70; Y02T 10/7072; Y02T 90/14
See application file for complete search history.

(56) References Cited

U.S. PATENT DOCUMENTS

| | | | |
|---|---|---|---|
| 2011/0148346 A1* | 6/2011 | Gagosz .................. | B60L 50/20 320/135 |
| 2014/0090916 A1 | 4/2014 | Lovley, II et al. | |
| 2019/0263281 A1* | 8/2019 | Wang ...................... | B60L 53/60 |

* cited by examiner

*Primary Examiner* — Omeed Alizada
(74) *Attorney, Agent, or Firm* — Dinsmore & Shohl LLP

(57) ABSTRACT

An embodiment takes the form of a locker includes a mobility device repository, an electrical system, a kiosk having a user interface, and a communication interface communicatively connected to a network. The mobility device repository is configured to secure one or more personal mobility devices at the mobility device repository. The electrical system is configured to receive electrical power and to charge respective batteries of the personal mobility devices secured at the mobility device repository using the electrical power. The locker receives a personal mobility device at the mobility device repository and secures the received personal mobility device at the mobility device repository, and receives a checked-in indication that the personal mobility device is checked in. The checked-in indication is received via the user interface or via the communication interface over the network. The locker charges a respective battery of the received personal mobility device using the electrical system.

17 Claims, 13 Drawing Sheets

SYSTEMS, DEVICES, AND METHODS FOR SHARING PERSONAL MOBILITY DEVICES

TECHNICAL FIELD

The present disclosure generally relates to systems, computing devices, and methods carried out by the systems and devices, and more specifically, to sharing systems, lockers, and methods carried out by the systems and lockers for sharing personal mobility devices.

BACKGROUND

A mobility device sharing system may include electric scooters and other personal mobility devices that are available for short-term use, such as the duration of a rental. In some systems, such personal mobility devices may not have a designated home location, but may instead be dropped off and picked up from arbitrary locations in an area serviced by the system. However, these systems lack various functionality, such as efficient storage of the personal mobility devices or charging locations for charging the personal mobility devices.

SUMMARY

An embodiment of the present disclosure takes the form of a locker that includes a mobility device repository, an electrical system, a kiosk having a user interface, a communication interface communicatively connected to a network, a processor, and a non-transitory computer readable storage medium. The mobility device repository is configured to secure one or more personal mobility devices at the mobility device repository. The electrical system is configured to receive electrical power from a power source and to charge respective batteries of the personal mobility devices secured at the mobility device repository using the received electrical power. The non-transitory computer readable storage medium comprises instructions that, when executed by the processor, cause the locker to receive a respective personal mobility device at the mobility device repository and secure the received personal mobility device at the mobility device repository, and to receive a checked-in indication that the respective personal mobility device is checked in. The checked-in indication is received via the user interface or via the communication interface over the network. The instructions further cause the locker to charge a respective battery of the received personal mobility device using the electrical system.

Another embodiment takes the form of a method that includes receiving a respective personal mobility device at a mobility device repository of a locker and securing the received personal mobility device at the mobility device repository, and receiving a checked-in indication that the respective personal mobility device is checked in. The locker includes a kiosk having a user interface and further includes a communication interface communicatively connected to a network. The checked-in indication is received via the user interface or via the communication interface over the network. The method further includes charging a respective battery of the received personal mobility device using an electrical system of the locker.

A further embodiment takes the form of a locker that includes a mobility device repository, a lift, an electrical system, a kiosk having a user interface, a communication interface communicatively connected to a network, a processor, and a non-transitory computer readable storage medium. The mobility device repository takes the form of (or includes) an enclosure configured to secure one or more personal mobility devices at the mobility device repository within the enclosure, and the enclosure includes a receiving opening positioned on a first surface of the enclosure. The lift is configured to receive the respective personal mobility device at a ground surface, and is movable along the first surface of the enclosure between the ground surface and the receiving opening. The electrical system is configured to receive electrical power from a power source and to charge respective batteries of the personal mobility devices secured at the mobility device repository using the received electrical power. The non-transitory computer readable storage medium comprises instructions that, when executed by the processor, cause the locker to receive a checked-in indication that a respective personal mobility device is checked in at a first location other than the locker, and in response to receiving the checked-in indication, instruct the respective personal mobility device to autonomously drive to the locker. The checked-in indication is received via the user interface or via the communication interface over the network. The instructions further cause the locker to receive, at the lift, the respective personal mobility device autonomously driven to the locker, and to elevate the respective personal mobility device received at the lift from the ground surface to the receiving opening. The instructions further cause the locker to transfer the elevated personal mobility devices from the lift into the enclosure, and to secure the received personal mobility device at the mobility device repository within the enclosure. The instructions further cause the locker to charge a respective battery of the received personal mobility device using the electrical system.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Mobility device sharing systems, mobility device lockers, and methods carried out by the systems and lockers are disclosed herein. In some embodiments, a locker includes a mobility device repository, an electrical system, a kiosk having a user interface, a communication interface communicatively connected to a network, a processor, and a non-transitory computer readable storage medium. The mobility device repository is configured to secure one or more personal mobility devices at the mobility device repository. The electrical system is configured to receive electrical power from a power source and to charge respective batteries of the personal mobility devices secured at the mobility device repository using the received electrical power. The non-transitory computer readable storage medium comprises instructions that, when executed by the processor, cause the locker to receive a respective personal mobility device at the mobility device repository and secure the received personal mobility device at the mobility device repository, and to receive a checked-in indication that the respective personal mobility device is checked in. The checked-in indication is received via the user interface or via the communication interface over the network. The instructions further cause the locker to charge a respective battery of the received personal mobility device using the electrical system. Various embodiments of mobility device sharing systems, mobility device lockers, and methods carried out by the systems and lockers will now be described in detail with reference to the drawings.

A mobility device sharing system may facilitate a service in which electric scooters or other personal mobility devices are made available for shared use to individuals on a short-term basis. Such a mobility device sharing system may include mobility device lockers that secure personal mobility devices at the respective lockers, and that release a personal mobility device from a locker when checked out by an individual. The individual may check in the personal mobility device by returning the personal mobility device to the same locker or a different locker, which may secure the returned personal mobility device at the locker. The lockers may be electrically powered and provided with network access, and components for charging personal mobility devices may be built-in to the lockers. The lockers may include respective kiosks for checking out and checking in personal mobility devices, and for monitoring the status of the lockers and the system as a whole. As another possibility, monitoring may be achieved remotely using the provided network access. The system (and/or the individual lockers) may prevent an uneven or unbalanced distribution of personal mobility devices at the respective lockers.

Figure 1:
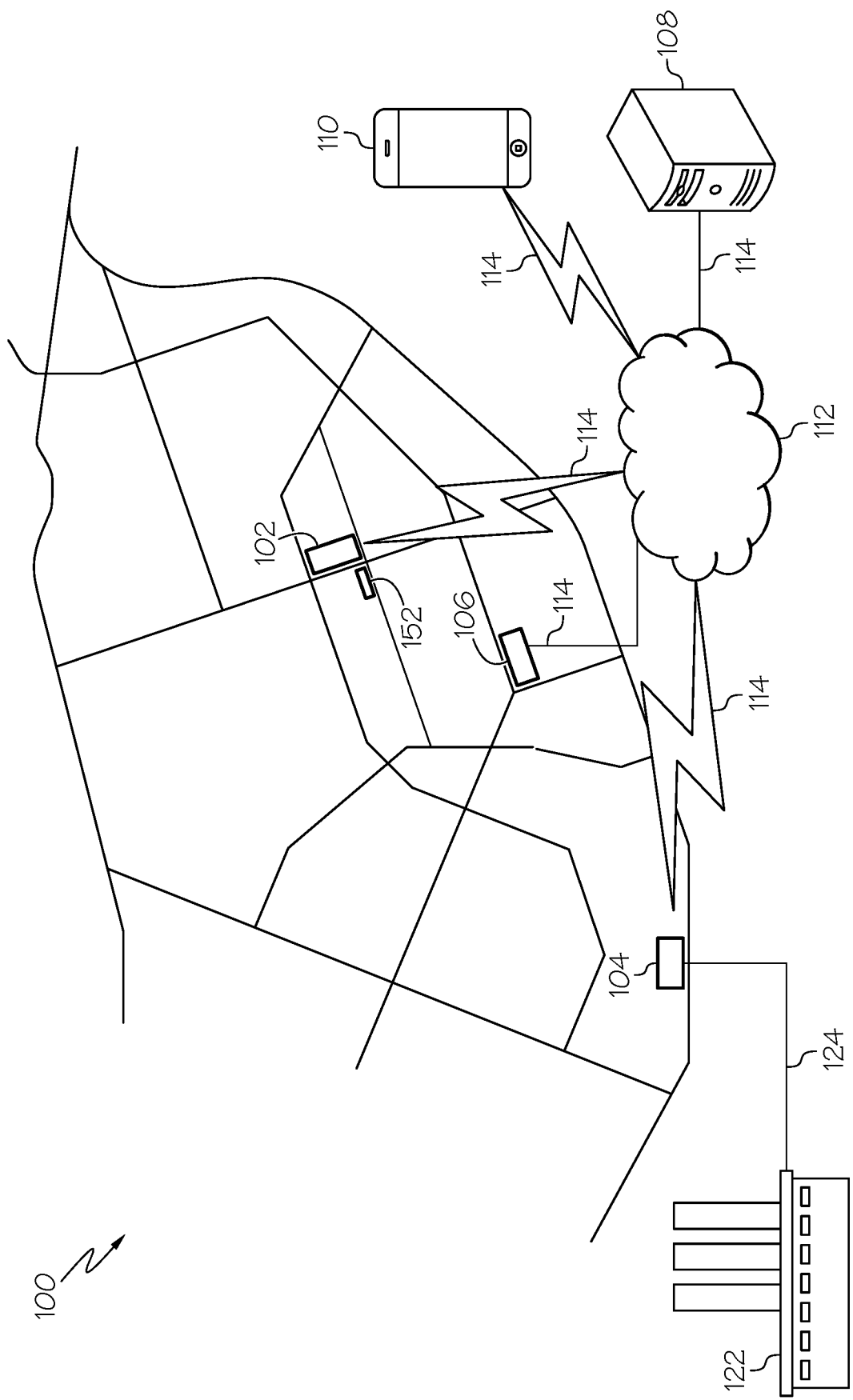
FIG. 1 depicts a diagram of a mobility device sharing system, according to one or more embodiments illustrated and described herein.

FIG. 1 depicts a diagram of a mobility device sharing system, according to one or more embodiments illustrated and described herein. As shown, a system 100 includes a locker 102, a locker 104, a locker 106, a server computer 108, and a remote terminal 110, each of which are communicatively connected via a network 112 and a respective communication link such as communication links 114 illustrated in FIG. 1. System 100 further includes a centralized power source 122 that is electrically coupled to locker 104 via an electrical link 124.

Locker 102, locker 104, and/or locker 106 may be configured to secure one or more personal mobility devices, such as a personal mobility device 152, at the respective locker. Personal mobility device 152 may take the form of a standing scooter, a self-balancing scooter such as a Toyota Winglet, or a combination of these, as examples. Locker 102 could have a generally vertical orientation, and could be mounted to a wall such as a side of a building. In an example, locker 102 is 0.5 meters deep and 2 meters tall, and provides approximately 2.5 meters of sidewalk space in front of the locker. Locker 102 may be arranged to keep personal mobility devices off sidewalks in proximity to locker 102, and a locker awning may shelter the personal mobility devices and/or the components of the locker from weather or other elements. Locker 102 may could be painted to match a style of the city or a style of the vicinity of the locker. Locker 104 and/or locker 106 may take a form similar to locker 102, and locker 102, locker 104, and/or locker 106 could take other forms as well.

Figure 3C:
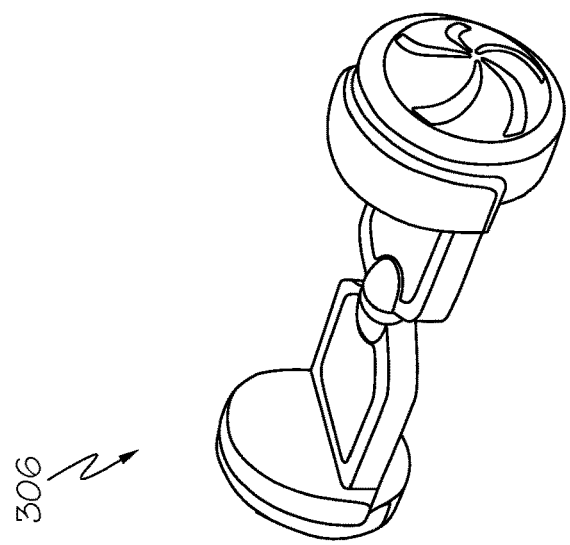
FIG. 3c depicts an example of a personal mobility device, according to one or more embodiments illustrated and described herein.
Figure 3B:
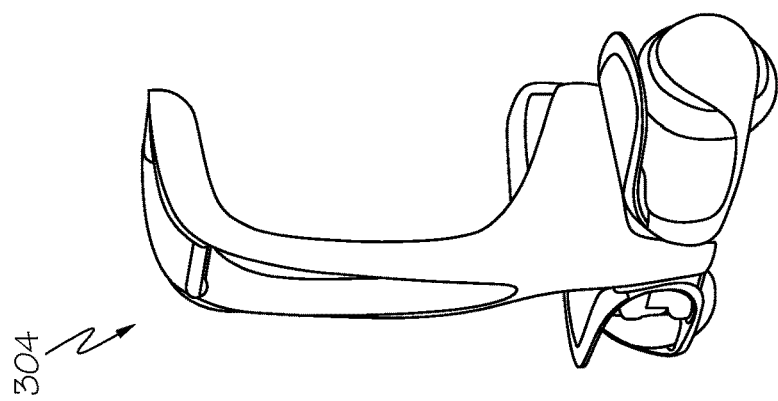
FIG. 3b depicts an example of a personal mobility device, according to one or more embodiments illustrated and described herein.
Figure 3A:
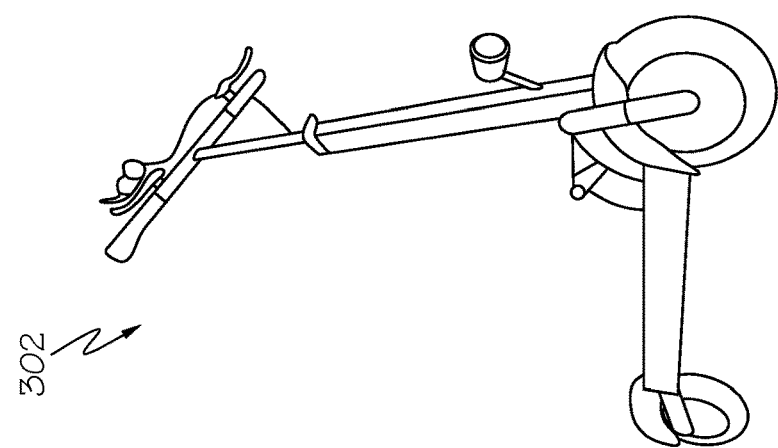
FIG. 3a depicts an example of a personal mobility device, according to one or more embodiments illustrated and described herein.
Figure 3D:
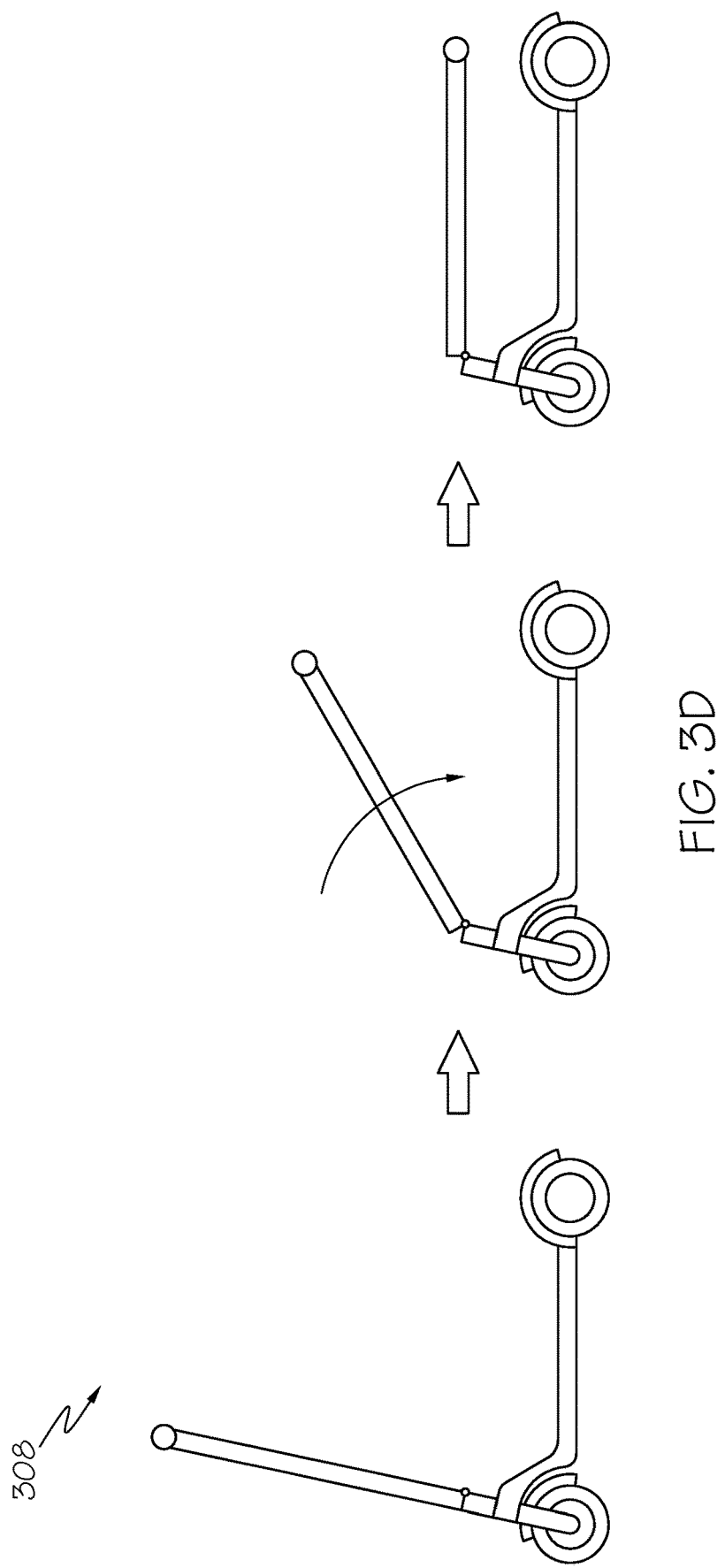
FIG. 3d depicts an example of a personal mobility device, according to one or more embodiments illustrated and described herein.

FIG. 3a, FIG. 3b, FIG. 3c, and FIG. 3d each depict a respective example of personal mobility device 152, according to one or more embodiments illustrated and described herein. As shown in FIG. 3a, a personal mobility device 302 takes the form of a standing scooter. Additionally, as shown in FIG. 3b, a personal mobility device 304 takes the form of a self-balancing scooter, a specific example of which is a personal mobility device 306 shown in FIG. 3c in the form of a self-balancing hoverboard. A personal mobility device 308 shown in FIG. 3d takes the form of a foldable standing scooter. Personal mobility device 152 may be an electric personal mobility device, and may be communicatively connected to network 112 via a wireless communication link (and/or a wired communication link when secured at locker 102), among other examples. It will be appreciated that personal mobility device 152 may take other forms without departing from the scope of the disclosure.

With reference again to FIG. 1, server computer 108 could take the form of a mainframe, a workstation, a terminal, a personal computer, a virtual machine, or any combination of these or other server computers configured to carry out the server-computer functions described herein. Though system 100 is shown as including a single server computer, those of skill in the art will appreciate that the system could include multiple server computers.

Remote terminal 110 may be any component capable of carrying out the remote-terminal functions described herein, and could take the form of (or include) a workstation, a personal computer, a tablet device, a smartphone, or any combination of these, as just a few examples. The remote terminal may include a user interface configured to output information to a user and/or receive input from the user. In an embodiment, remote terminal 110 is configured to present, via the user interface, output received from a computing device such as locker 102, locker 104, locker 106, server computer 108, or any combination of these or other computing devices, as examples. In a further embodiment, the remote terminal is configured to provide input, received via the user interface, to the previously mentioned computing device. The output may be received (and/or the input provided) over network 112 via one or more communication links 114. In an embodiment, remote terminal 110 (e.g., a smartphone) executes an application for checking out and/or checking in a personal mobility device from locker 102 (or another locker). Remote terminal 110 may take other forms as well.

Network 112 may include one or more computing systems and at least one network infrastructure configured to facilitate transferring data between one or more entities communicatively connected to network 112. The network may include one or more wide-area networks (WANs) and/or local-area networks (LANs), which may be wired and/or wireless networks. In some examples, the network may include the Internet and/or one or more wireless cellular networks, among other possibilities. The network may operate according to one or more communication protocols such as Ethernet, Wi-Fi, Internet Protocol (IP), Transmission Control Protocol (TCP), Bluetooth, Universal Serial Bus (USB), and a cellular network protocol (or protocols), among other possibilities. Examples of cellular network protocols include a fifth generation (5G) protocol, Long-Term Evolution (LTE), CDMA2000, Universal Mobile Telecommunications System (UMTS), Interim Standard 95 (IS-95), and Global System for Mobile Communications (GSM). Although the network is shown as a single network, it should be understood that the network may include multiple, distinct networks that are themselves communicatively linked. The network could take other forms as well.

Communication links 114 may communicatively link respective entities with network 112 to facilitate communication between entities communicatively connected to the network. Any of communication links 114 may take the form of multiple communication links, and may be a combination of hardware and/or software, perhaps operating on one or more communication-link layers such as one or more physical, network, transport, and/or application layers.

Centralized power source 122 may take the form of an electrical power source configured to provide electrical power to one or more components of system 100. For instance, in FIG. 1, centralized power source 122 provides electrical power to locker 104 via electrical link 124, though it should be understood that the centralized power source (or any other power source) may provide electrical power to locker 102, locker 104, locker 106, server computer 108, another locker or server computer, any other component of system 100, or any combination of these, among other possibilities. Centralized power source 122 could take the form of a mains electrical power source, as an example.

It should be understood that system 100 may include different and/or additional components. As an example, system 100 may include additional and/or fewer lockers, server computers, remote terminals, and/or communication links. Additionally, the functions of a given component of system 100 may be carried out by a different component or by multiple components, and multiple components of system 100 may be combined into a single component. For instance, locker 102 (or another locker) could be combined with server computer 108 and could be configured to carry out the server functions described herein. System 100 may take other forms as well.

Figure 2:
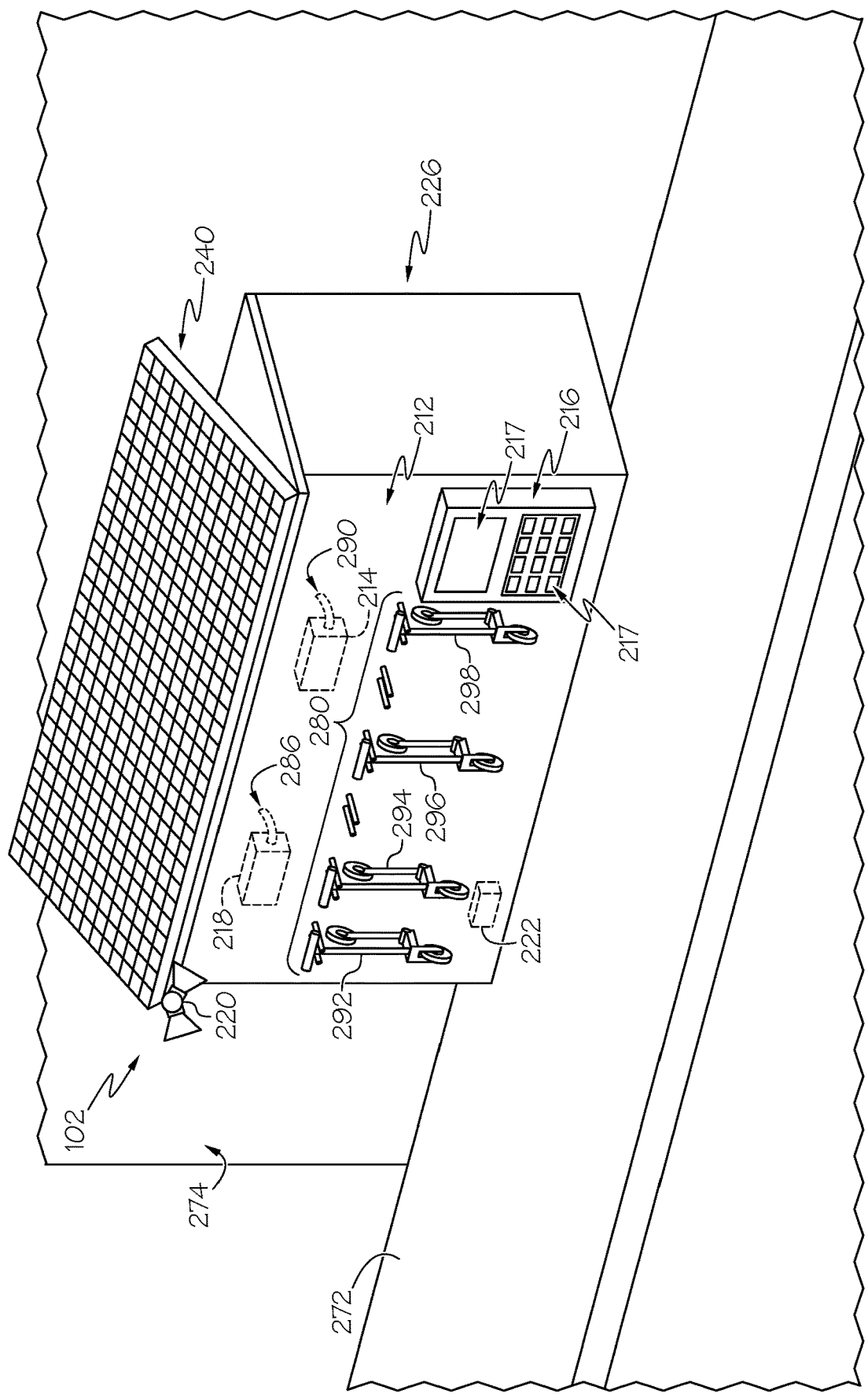
FIG. 2 depicts a mobility device locker, according to one or more embodiments illustrated and described herein.

FIG. 2 depicts a mobility device locker, according to one or more embodiments illustrated and described herein. As shown, locker 102 includes a mobility device repository 212, an electrical system 214, a kiosk 216, a communication interface 218, a camera 220, and a locker controller 222. A locker awning 240 covers at least part of locker 102. In an embodiment, the locker 102 ensures proper charging levels, has built-in charging, and provides security and maintenance to personal mobility devices secured at the locker.

Mobility device repository 212 is configured to secure one or more personal mobility devices 280 at the mobility device repository, such as personal mobility device 292, personal mobility device 294, personal mobility device 296, and personal mobility device 298. Mobility device repository 212 includes an attachment surface 226 that is configured to attach the mobility device repository to a wall 274 extending perpendicularly from a ground surface 272 such that the mobility device repository extends from the wall. In the illustrated embodiment, attachment surface 226 is configured to hold the mobility device repository 212 above ground surface 272.

Electrical system 214 is configured to receive electrical power from a power source, and to charge respective batteries of one or more of personal mobility devices 280 secured at mobility device repository 212 using the received electrical power. As an example, electrical system 214 may receive electrical power from centralized power source 122, a solar panel (e.g., that is attached to or that forms the locker awning 240), another power source, or a combination of these, as examples. In an embodiment, electrical system 214 is configured to receive the electrical power via at least an electrical wiring 290 that is positioned on wall 274. The electrical wiring could comprise an electrical link that electrically couples the electrical system 214 to a power source, such as an electrical link similar to electrical link 124 described above with reference to FIG. 1. In one such embodiment, electrical wiring 290 positioned on wall 274 comprises an electrical wiring arranged through the wall.

Kiosk 216 may be configured to receive input from a user and/or output information to a user. User input might be achieved via a user interface 217 that is part of or communicatively coupled to kiosk 216. User interface 217 could include an input device such as a touchscreen display, a keyboard, a mouse, another input device, or a combination of these, as examples, and input may be realized via the input device. As another possibility, user interface 217 could include an output device such as a touchscreen display, a loudspeaker (such as a computer speaker), a computer monitor, another output device, or any combination of these, among other examples, and output may be achieved via the output device. Some components may provide for both input and output, such as the above-mentioned touchscreen display.

Communication interface 218 may be communicatively connected to network 112, and may send and receive data over the network via a respective communication link (such as one or more of communication links 114). In an embodiment, communication interface 218 is communicatively connected to network 112 via at least a wired communication link 286 positioned on wall 274. In one such embodiment, wired communication link 286 positioned on wall 274 comprises a wired communication link arranged through the wall. In another embodiment, communication interface 218 is communicatively connected to network 112 via at least a wireless communication link, which may comprise at least one of a Wi-Fi link and a cellular network link. The cellular network link could comprise at least one of a 5G link, an LTE link, a CDMA2000 link, a UMTS link, an IS-95 link, and a GSM link, among other examples.

Camera 220 could take the form of a digital camera, a charge-coupled device (CCD) camera, a complementary metal-oxide-semiconductor (CMOS) camera, another camera, or a combination of these, as examples. Camera 220 may be configured to obtain an image of at least part of locker 102 via the camera, and may be positioned accordingly. For instance, camera 220 may be mounted to locker awning 240, as illustrated in FIG. 2.

Locker controller 222 may facilitate the locker 102 carrying out one or more locker functions described herein, and may be communicatively coupled to one or more other components of locker 102 such as mobility device repository 212, electrical system 214, kiosk 216, user interface 217, communication interface 218, and/or camera 220. Additional details regarding locker controller 222 are provided below.

Locker awning 240 may be arranged to cover at least part of locker 102. In an embodiment, a mobility device locker structure comprises locker 102 and locker awning 240 covering at least part of locker 102. As one possibility, locker awning 240 may comprise a solar panel configured to generate electrical power from sunlight received at the solar panel. In one such embodiment, electrical system 214 is configured to receive the generated electrical power from the solar panel. Locker awning 240 may take other forms as well.

Figure 4:
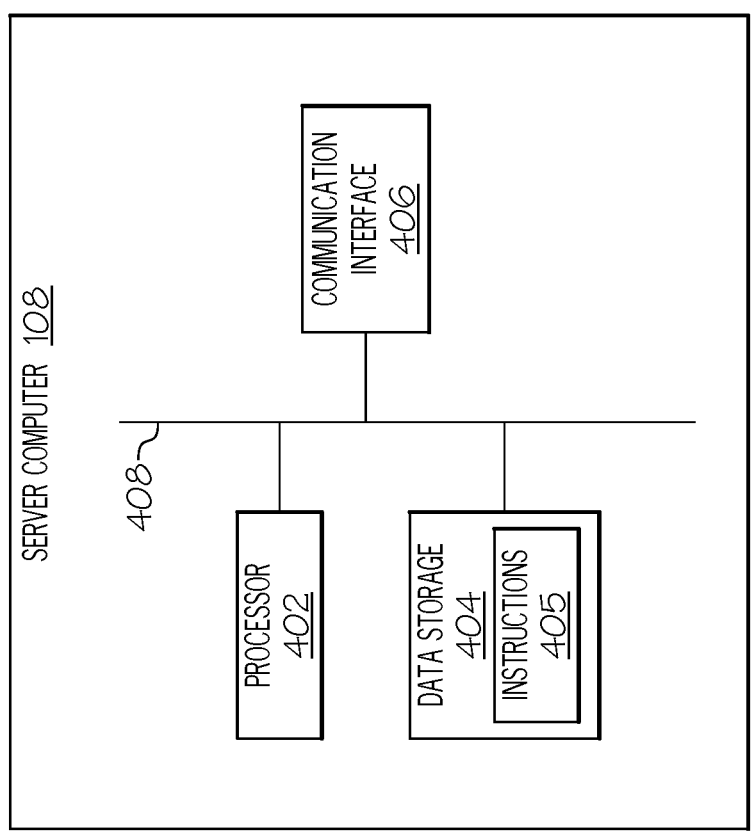
FIG. 4 depicts a block diagram of a server computer, according to one or more embodiments illustrated and described herein.

FIG. 4 depicts a block diagram of a server computer, according to one or more embodiments described and illustrated herein. As shown, server computer 108 includes a processor 402, a data storage 404, and a communication interface 406, each of which is communicatively connected via a system bus 408.

Processor 402 may take the form of one or more general-purpose processors and/or one or more special-purpose processors, and may be integrated in whole or in part with data storage 404, communication interface 406, and/or any other component of server computer 108, as examples. Accordingly, processor 402 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 404 may store one or more instructions 405 and/or other data, and may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database managements system (RDBMS), any other non-volatile storage, or any combination of these, among other possibilities. Data storage 404 may store data as a table, a flat file, data in a file system of the data storage, a heap file, a B+ tree, a hash table, a hash bucket, or any combination of these, as examples. Instructions 405, when executed by processor 402, may cause server computer 108 to carry out the server computer functions described herein. In an embodiment, instructions 405 comprise machine-language instructions executable by processor 402, and/or script instructions executable by a script interpreter configured to cause processor 402 to execute the instructions specified in the script instructions. Those having skill in the art will recognize that data storage 404 and/or instructions 405 may take other forms as well.

Communication interface 406 may be any component capable of performing the communication interface functions described herein. As such, communication interface 406 could take the form of an Ethernet, Wi-Fi, Bluetooth, USB, and/or cellular network interface, among many other examples. Communication interface 406 may send and receive data over network 112 via communication links 114, for instance.

System bus 408 may be any component capable of performing the system bus functions described herein. In an embodiment, system bus 408 is any component configured to transfer data between the processor 402, the data storage 404, communication interface 406, and/or any other component of server computer 108. In an embodiment, system bus 408 includes a traditional bus as is known in the art. In other embodiments, system bus 408 includes a serial RS-232 communication link, a USB communication link, and/or an Ethernet communication link, alone or in combination with a traditional computer bus, among numerous other possibilities. In some examples, system bus 408 may be formed from any medium that is capable of transmitting a signal, such as conductive wires, conductive traces, or optical waveguides, among other possibilities. Moreover, system bus 408 may be formed from a combination of mediums capable of transmitting signals. As a further possibility, system bus 408 could take the form of (or include) a vehicle bus, such as a local interconnect network (LIN) bus, a controller area network (CAN) bus, a vehicle area network (VAN) bus, or any combination of these or mediums. Those of skill in the art will recognize that system bus 408 may take various other forms as well.

It should be understood that server computer 108 may include different and/or additional components, and the functions of a given component of server computer 108 may be carried out by a different component or by multiple components. Additionally, multiple components of server computer 108 may be combined into a single component. Server computer 108 may take other forms as well.

Figure 5:
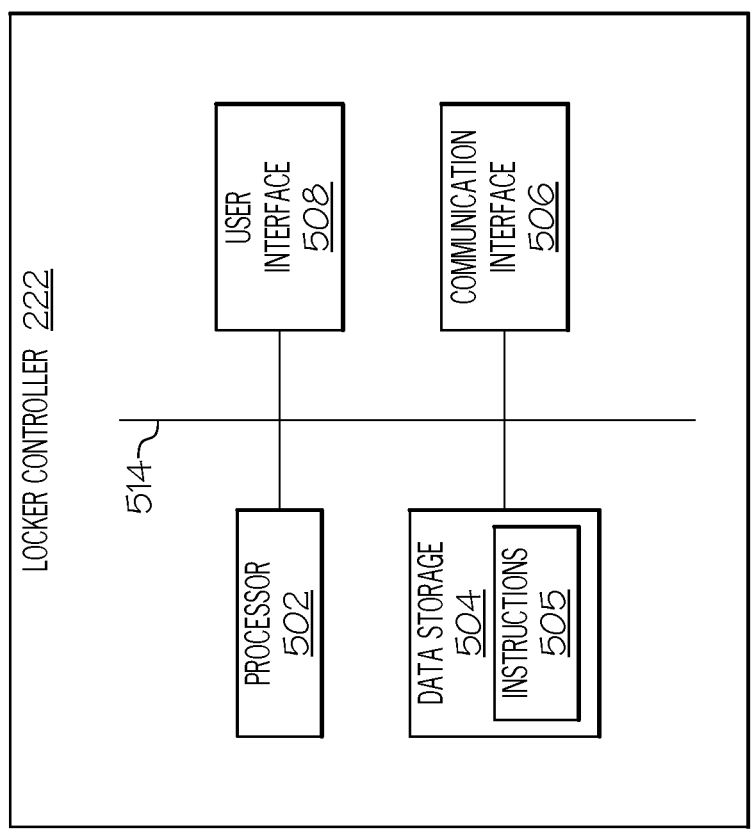
FIG. 5 depicts a block diagram of a locker controller, according to one or more embodiments illustrated and described herein.

FIG. 5 depicts a block diagram of a locker controller, according to one or more embodiments described and illustrated herein. As shown, locker controller 222 includes a processor 502, a data storage 504, a communication interface 506, and a user interface 508, each of which are communicatively connected via a system bus 514. In some embodiments, server computer 108 (and the respective components of the server computer illustrated in FIG. 4) may be combined with locker controller 222.

Processor 502 may take a form similar to processor 402 described with reference to FIG. 4. As such, processor 502 may take the form of one or more general-purpose processors and/or one or more special-purpose processors, and may be integrated in whole or in part with data storage 504, communication interface 506, user interface 508, and/or any other component of locker controller 222, as examples. Processor 502 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 504 may likewise take a form similar to data storage 404 described with reference to FIG. 4. As such, data storage 504 may store one or more instructions 505 and/or other data, and may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database managements system (RDBMS), any other non-volatile storage, or any combination of these, among other possibilities. Data storage 504 may store data as a table, a flat file, data in a file system of the data storage, a heap file, a B+ tree, a hash table, a hash bucket, or any combination of these, as examples. Instructions 505, when executed by processor 502, may cause locker controller 222 to carry out the locker controller functions described herein. In an embodiment, instructions 505 comprise machine-language instructions executable by processor 502, and/or script instructions executable by a script interpreter configured to cause processor 502 to execute the instructions specified in the script instructions. Those having skill in the art will recognize that data storage 504 and/or instructions 505 may take other forms as well.

Communication interface 506 may take a form similar to communication interface 406 described with reference to FIG. 4. As such, communication interface 506 may be any component capable of performing the communication interface functions described herein, and could take the form of an Ethernet, Wi-Fi, Bluetooth, USB, and/or cellular network interface, among many other examples. Communication interface 506 may send and receive data over network 112 via communication links 114, for instance. In an embodiment, communication interface 506 takes the form of (or includes) communication interface 218 of locker 102.

User interface 508 may be any component capable of carrying out the user-interface functions described herein. For example, user interface 508 may be configured to receive input from a user via user interface 217 of kiosk 216, and/or output information to the user via the user interface device. Those having skill in the art will understand that user interface 508 may take numerous other forms as well. In an embodiment, user interface 508 takes the form of (or includes) user interface 217 of locker 102.

System bus 514 may be any component capable of performing the system-bus functions described herein. In an embodiment, system bus 514 is any component configured to transfer data between the processor 502, the data storage 504, communication interface 506, user interface 508, and/or any other component of locker controller 222. System bus 514 may take a form similar to system bus 408 described with reference to FIG. 4.

Figure 6:
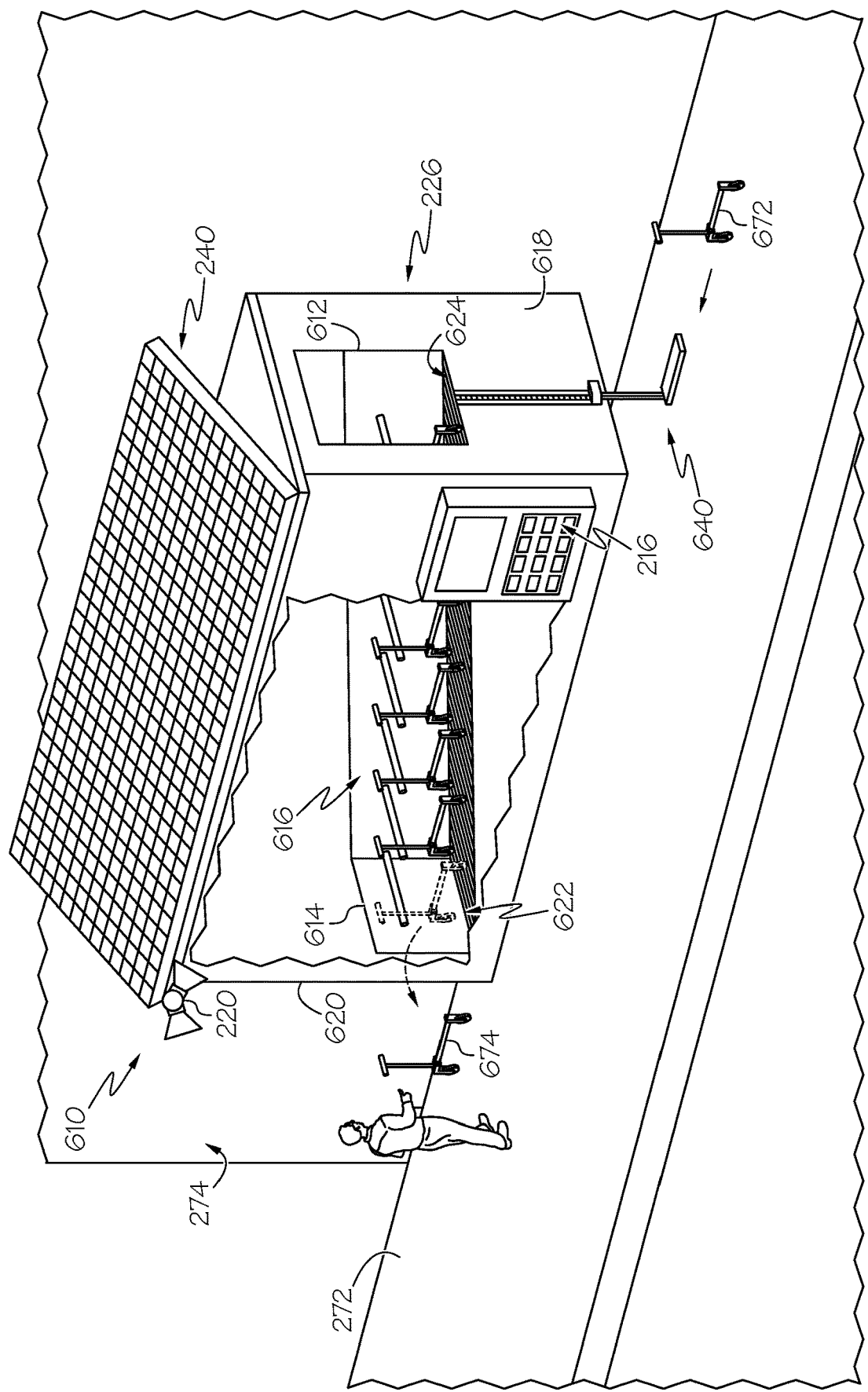
FIG. 6 depicts a mobility device enclosure, according to one or more embodiments illustrated and described herein.

FIG. 6 depicts a mobility device enclosure, according to one or more embodiments illustrated and described herein. As shown, a mobility device repository (such as mobility device repository 212 illustrated in FIG. 2) includes an enclosure 610, and the locker includes a lift 640. In the illustrated embodiment, an attachment surface of enclosure 610 (such as attachment surface 226 of mobility device repository 212 shown in FIG. 1) is configured to hold the enclosure above ground surface 272—for example, by attaching to wall 274 extending perpendicularly from the ground surface.

Enclosure 610 is configured to secure one or more personal mobility devices within the enclosure, and includes a receiving opening 612, a discharge opening 614, and a conveyer 616. Receiving opening 612 may be configured to receive a given personal mobility devices 672 into enclosure 610, and may be positioned on a first surface 618 of the enclosure other than an attachment surface of the enclosure (e.g., attachment surface 226 of mobility device repository 212). Discharge opening 614 may be configured to dispense a given personal mobility devices 674 from within enclosure 610, and may be positioned on a second surface 620 of enclosure 610 opposite of first surface 618. Discharge opening 614 may be positioned at a position lower to ground surface 272 than receiving opening 612.

Conveyer 616 is configured to secure one or more personal mobility devices within enclosure 610, and includes a dispensing end 622 and a receiving end 624. Dispensing end 622 may be configured to discharge personal mobility device 674 from conveyer 616, and may be configured to discharge personal mobility device 674 through discharge opening 614. Receiving end 624 may be configured to receive personal mobility device 672 onto conveyer 616. For instance, receiving end 624 may be configured to receive personal mobility device 672 through receiving opening 612 and onto conveyer 616.

Lift 640 may be configured to receive personal mobility device 672, elevate the received personal mobility device to receiving opening 612, and provide the elevated personal mobility devices into enclosure 610 and onto conveyer 616 through the receiving opening. For instance, lift 640 may be configured to receive personal mobility device 672 at ground surface 272. Lift 640 may be movable along first surface 618 of enclosure 610 between ground surface 272 and receiving opening 612, and may switch between an open position and a closed position, as just a few examples.

Figure 7A:
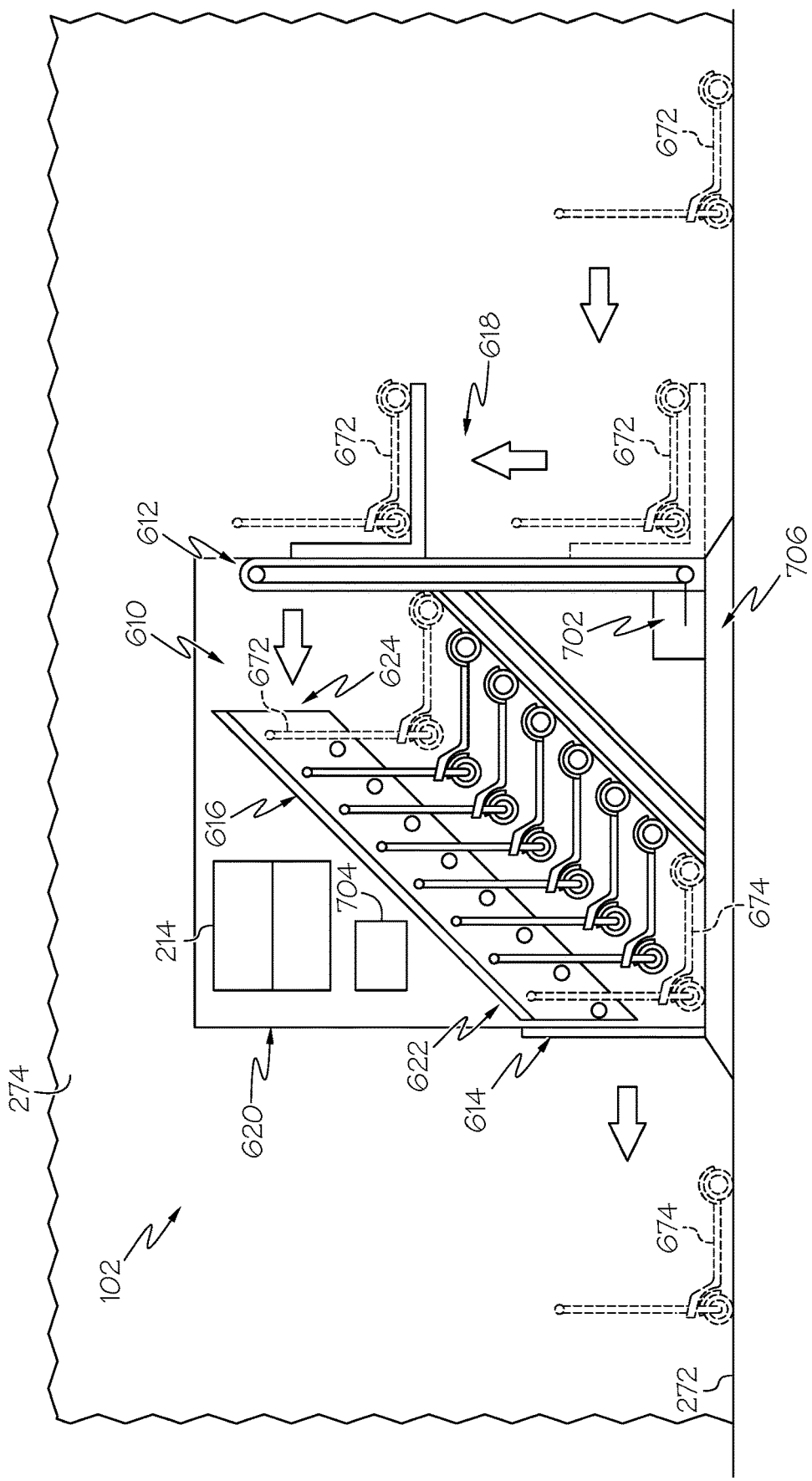
FIG. 7a depicts a view of a mobility device enclosure, according to one or more embodiments illustrated and described herein.
Figure 7B:
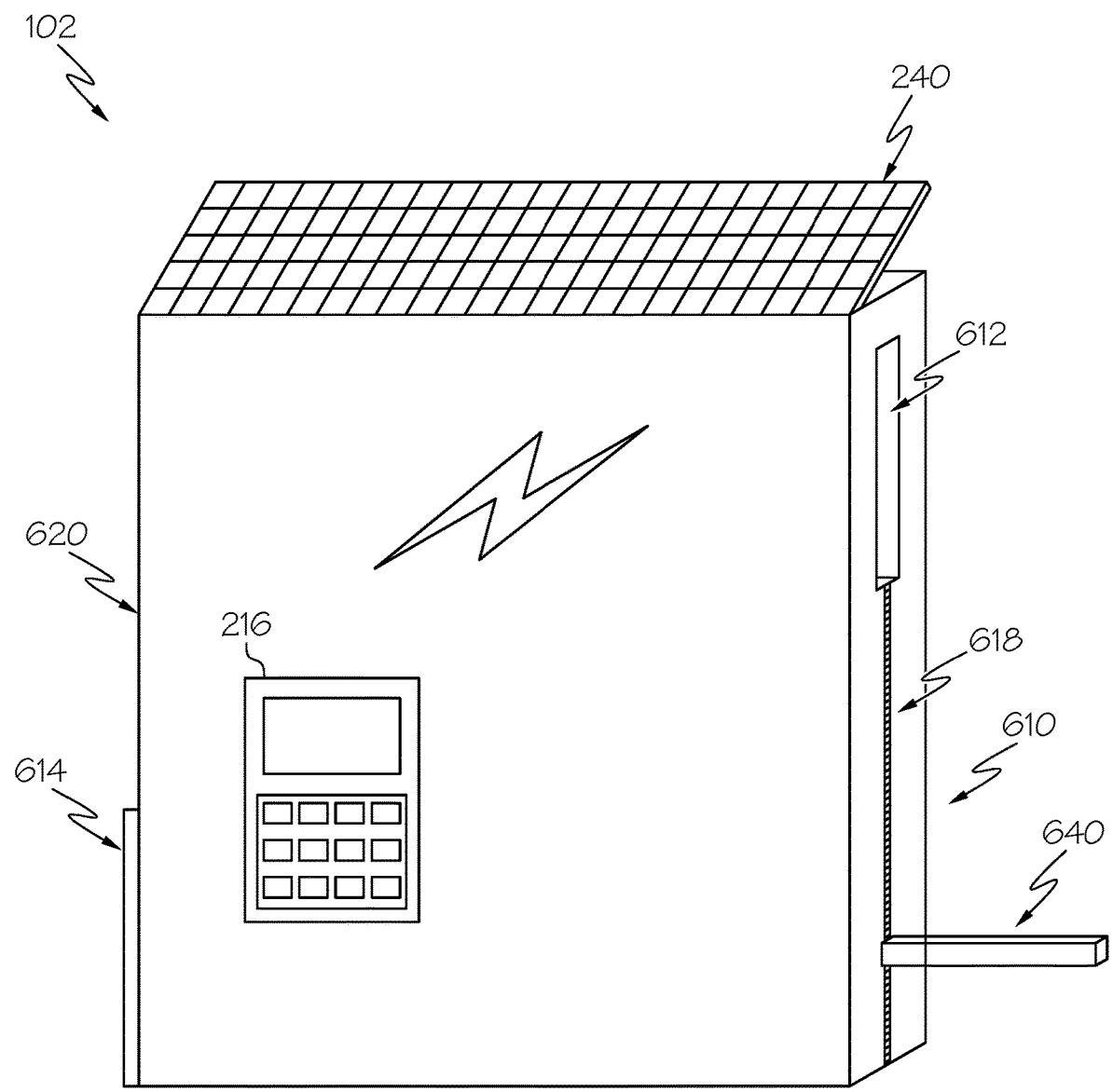
FIG. 7b depicts a view of a mobility device enclosure, according to one or more embodiments illustrated and described herein.
Figure 7C:
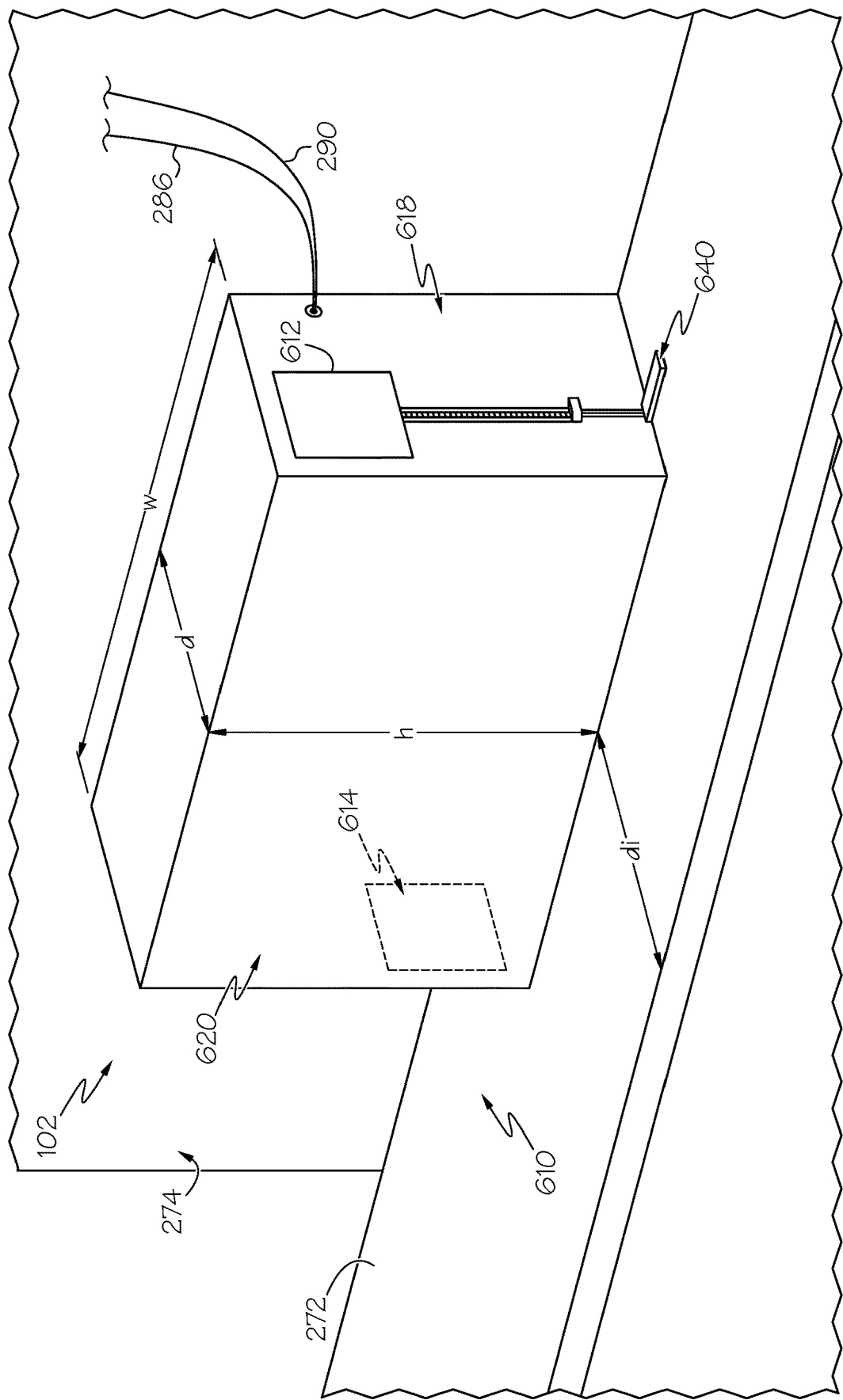
FIG. 7c depicts a view of a mobility device enclosure, according to one or more embodiments illustrated and described herein.

FIGS. 7a, 7b, and 7c depict respective views of a variant of enclosure 610 illustrated in FIG. 6, according to one or more embodiments illustrated and described herein. The variant depicted in these figures is not held above ground surface 272 by an attachment surface of enclosure 610. Instead, the mobility device enclosure is positioned at ground surface 272 (as shown in FIGS. 7a and 7c), and includes a ramp 706 arranged at a bottom surface of the enclosure (as shown in FIG. 7a). FIG. 7a depicts a cutaway view of the enclosure, and shows a lift actuator 702 for actuating the illustrated lift (such as lift 640 in FIG. 6), and a conveyer actuator 704 for actuating the conveyer 616, though it should be understood that the depicted lift actuator and conveyer actuator may be present in the embodiment illustrated in FIG. 6. FIG. 7b depicts a non-cutaway view of the enclosure showing kiosk 216 on a front surface of the enclosure opposite of the attachment surface of the enclosure. In an embodiment of FIG. 7c, a depth d of enclosure 610 is 0.5 meters, and a height h of the enclosure is 2 meters. A front surface of enclosure 610 is a distance di of approximates 2.5 meters from an opposite side of a sidewalk at ground surface 272.

Figure 8:
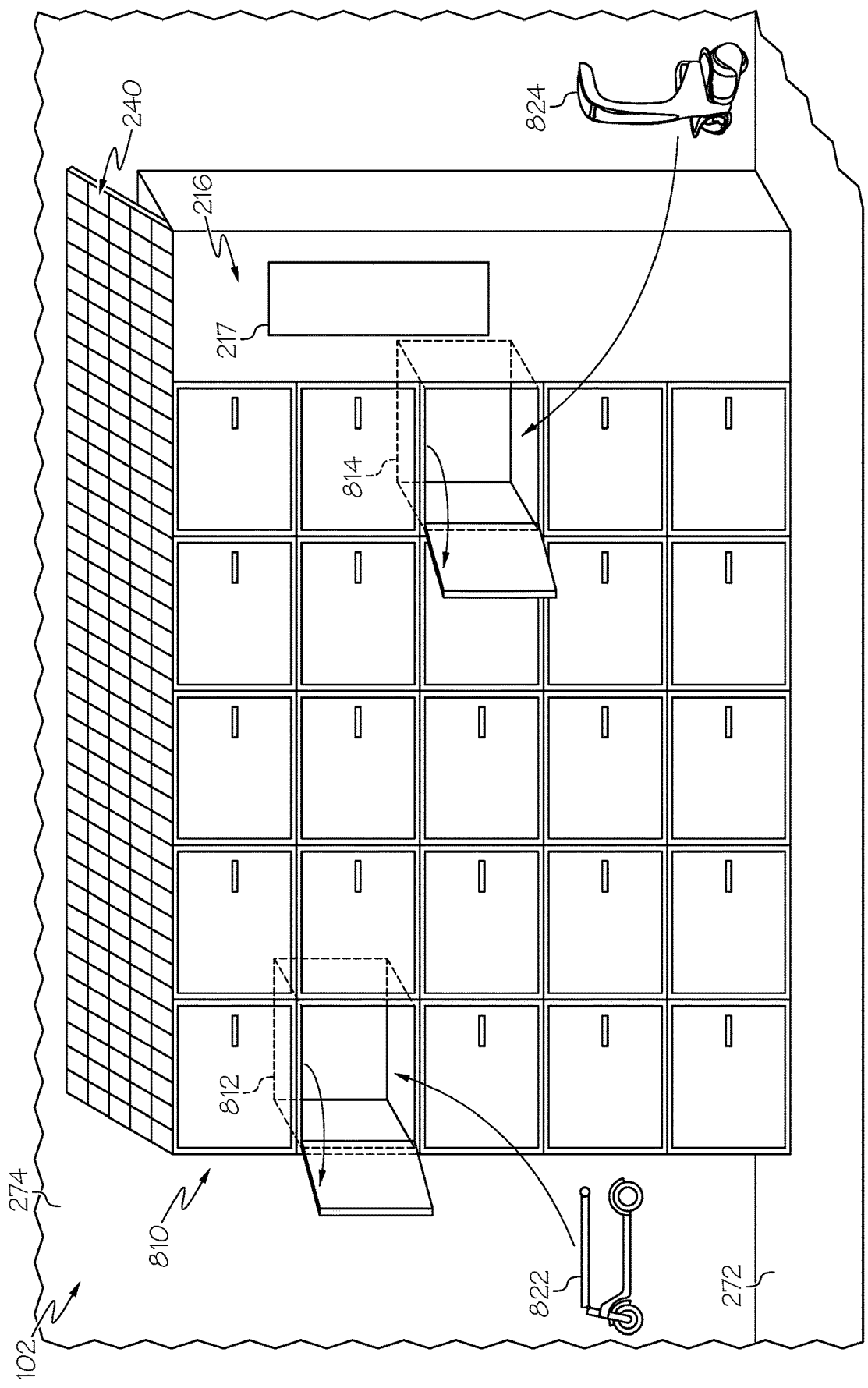
FIG. 8 depicts a mobility device locker bank, according to one or more embodiments illustrated and described herein.

FIG. 8 depicts a mobility device locker bank, according to one or more embodiments illustrated and described herein. In the illustrated embodiment, mobility device repository 212 takes the form of a locker bank 810 that includes multiple locker compartments, including a locker compartment 812 and a locker compartment 814. Each of the locker compartments may have a door that includes a respective locking mechanism for locking the door in the closed position. Locker bank 810 may store multiple types of personal mobility devices, such as foldable standing scooter 822 and self-balancing scooter 824, among other possibilities. The locker compartments may vary in size, or as shown in FIG. 8, the locker compartments may be of an identical size (or a combination of these). It should be appreciated that locker bank 810 could take other forms without departing from the scope of the disclosure.

Figure 9:
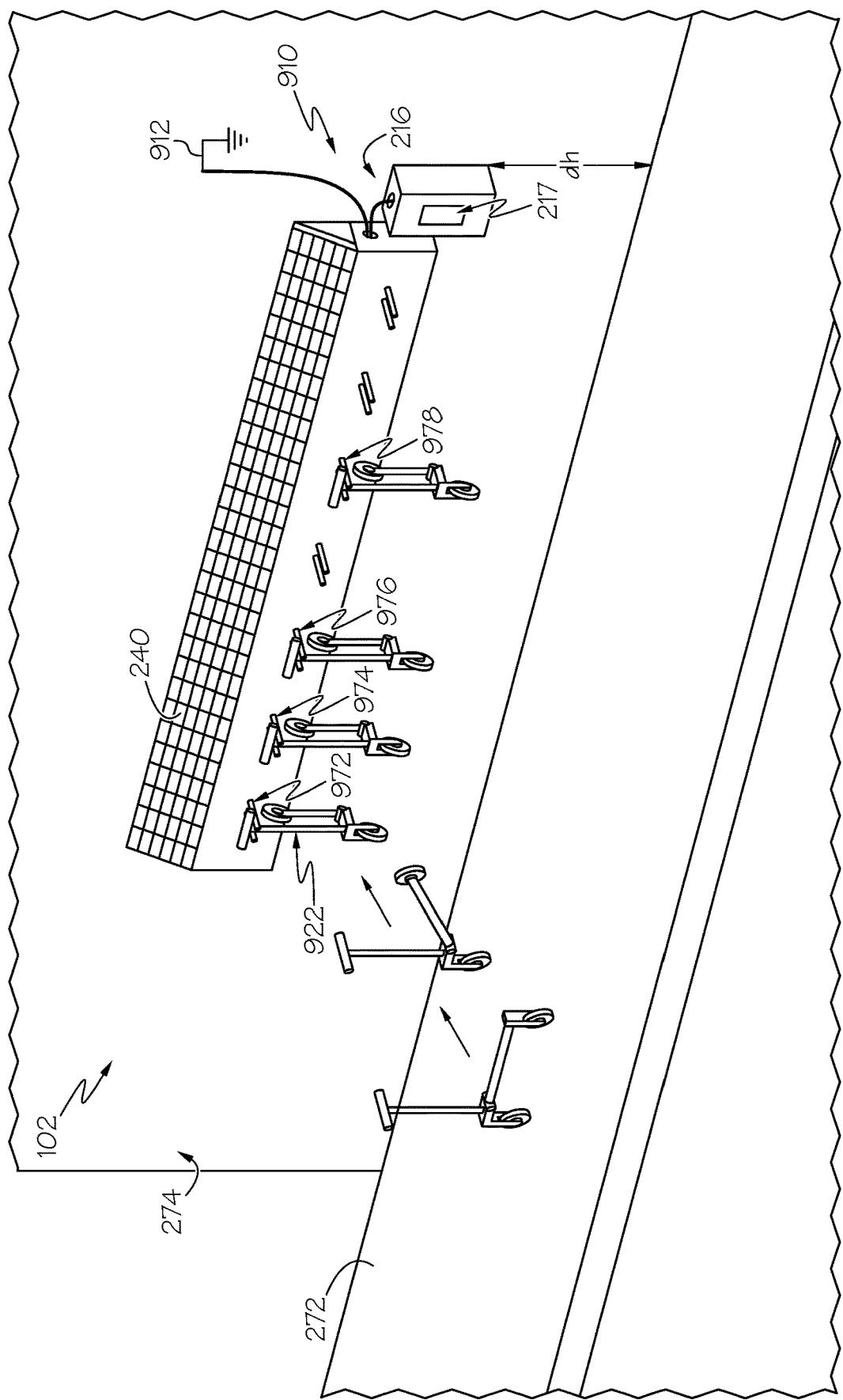
FIG. 9 depicts a mobility device rack, according to one or more embodiments illustrated and described herein.

FIG. 9 depicts a mobility device rack, according to one or more embodiments illustrated and described herein. As shown, a mobility device rack 910 (such as mobility device repository 212 illustrated in FIG. 2) includes attachment points 972, 974, 976, and 978 configured to secure respective personal mobility devices at the attachment points. For instance, in the illustrated embodiment, a personal mobility device 922 in the form of a foldable scooter is secured at attachment point 972. Mobility device rack 910 may be connected to a link 912 (such as a communication link 114 and/or an electrical link 124), and may be elevated by a given distance dh from ground surface 272. Mobility device rack 910 and/or personal mobility device 922 may take other forms as well.

In an embodiment, locker 102 receives a respective personal mobility device S (not illustrated) at mobility device repository 212 and secures the received personal mobility device at the mobility device repository. Receiving personal mobility device S at mobility device repository 212 may include locker 102 making a mobility-device presence determination of the presence of personal mobility device S at the mobility device repository. As an example, locker 102 may determine the presence of personal mobility device S by detecting the presence of the personal mobility device at lift 640. As another example, locker 102 may determine the presence of personal mobility device S at an attachment point of mobility device repository 212, such as attachment point 972 (or another attachment point of mobility device rack 910), or at an attachment point of conveyer 616, among other possibilities.

Additionally or alternatively, receiving personal mobility device S at mobility device repository 212 may include receiving a request, via user interface 217 or via communication interface 218 over network 112, to return personal mobility device S to locker 102. It should be noted that, as used herein, "returning" (or "return" of) a personal mobility device does not necessarily imply that the personal mobility device is being returned to the same locker from which the personal mobility device may have been dispensed, or that the personal mobility device is being returned by the same individual to whom the personal mobility device was dispensed, or that the personal mobility device is part of system 100.

Receiving personal mobility device S at mobility device repository 212 may include locker 102 making an identity determination of an identity of the personal mobility device—for instance, by obtaining an identifier of the personal mobility device. As an example, locker 102 may obtain an identifier of personal mobility device S by receiving the identifier from the personal mobility device via a communication link with the personal mobility device at an attachment point (such as attachment point 972). As another example, locker 102 may obtain an identifier of personal mobility device S by obtaining an image of the identifier (e.g., a QR code or other identifier attached to the personal mobility device) via camera 220 or another camera of locker 102. As a further example, locker 102 may obtain an identifier of personal mobility device S by detecting the identifier from an RFID tag affixed to the personal mobility device. As another possibility, determining the identity of personal mobility device S may include receiving an identifier of the personal mobility device via kiosk 216 or from remote terminal 110 (e.g., during a check-in process). Other examples of determining an identity of personal mobility device S are possible as well.

Receiving personal mobility device S at mobility device repository 212 may include locker 102 making a return permitted determination that the personal mobility device may be returned to locker 102. As an example, locker 102 may make the return determination by determining that personal mobility device S is part of system 100 (for instance, based on the identity determination described above). As another example, locker 102 may make the return determination by determining that locker 102 is designated by system 100 to receive personal mobility device S. For instance, system 100 may designate the locker 102 (and only locker 102) to receive personal mobility device S. If system 100 had designated the locker 104 (instead of locker 102) to receive personal mobility device S, then locker 102 may determine that locker 102 is not designated to receive personal mobility device S, and may reject an attempt (e.g., a request) to return personal mobility device S to locker 102.

Securing personal mobility device S at mobility device repository 212 may include securing the personal mobility device at an attachment point of the mobility device repository, such as attachment point 972 or an attachment point of conveyer 616 in enclosure 610. In an embodiment, securing personal mobility device S at an attachment point of mobility device repository 212 includes latching the personal mobility device to the lift 640 positioned at ground surface 272. Locker 102 may latch personal mobility device S to lift 640, for example, in response to detecting the presence of personal mobility device S at the lift. If lift 640 is not already at ground level (e.g., when receiving a request, via kiosk 216 or from remote terminal 110, to return personal mobility device S to locker 102), then locker 102 may lower the lift to ground level using lift actuator 702.

In an embodiment, locker 102 elevates personal mobility device S, received at lift 640, to receiving opening 612 of enclosure 610. For instance, in response to latching the personal mobility device to lift 640, locker 102 may elevate the lift (and personal mobility device S latched to the lift) to receiving opening 612.

Subsequent to (e.g., in response to) to elevating personal mobility device S to receiving opening 612—for example, by elevating the lift 640 to which personal mobility device S may be attached in the above embodiment—locker 102 transfers personal mobility device S into enclosure 610. Transferring personal mobility device S into enclosure 610 may include transferring the personal mobility device from lift 640 through the receiving opening 612 to receiving end 624 of conveyer 616 in the enclosure. In an embodiment, locker 102 then attaches personal mobility device S (transferred through receiving opening 612) to an attachment point at receiving end 624 of conveyer 616. If the attachment point at receiving end 624 is unavailable to secure personal mobility device S at the attachment point, then locker 102 may advance the conveyer 616 (e.g., by advancing attachment points of the conveyer away from receiving end 624 and towards dispensing end 622 of the conveyer) until an attachment point at the receiving end is available to secure the personal mobility device. Locker 102 may then attach personal mobility device S to the attachment point at receiving end 624 available to secure the personal mobility device. Locker 102 may move lift 640 to a default position (e.g., lowered or elevated) after personal mobility device S has been attached to the attachment point.

Securing personal mobility device S at mobility device repository 212 may include securing the personal mobility device at locker compartment 812 (or another locker compartment) of locker bank 810. In an embodiment, securing personal mobility device S at locker compartment 812 includes locker 102 identifying the locker compartment 812 as available for securing personal mobility device S, for example, in response to receiving a request, via kiosk 216 or from remote terminal 110, to return personal mobility device S to locker 102. Identifying the locker compartment 812 as available for securing personal mobility device S may include locker 102 determining that locker compartment 812 is an empty compartment or determining that a personal mobility device is not secured at locker compartment 812. Locker 102 may provide an indicating of the available locker compartment, perhaps by presenting the indication via kiosk 216 or by providing the indication to remote terminal 110. Subsequent to identifying the locker compartment 812 as available (or subsequent to providing the indication of the available locker compartment), locker 102 makes a lock determination to lock a door of locker compartment 812. Making the lock determination may include detecting that the door of locker compartment 812 has been opened and subsequently closed. As another possibility, making the lock determination may include receiving a lock instruction—perhaps via kiosk 216, from remote terminal 110, or via a button or other input device of locker compartment 812—and responsively detecting that a door of the locker compartment is closed. In response to making the lock determination, locker 102 may lock the door of locker compartment 812, such as by actuating a locking mechanism provided on the door.

In an embodiment, locker 102 receives a checked-in indication that personal mobility device S is checked in. The checked-in indication may be received via user interface 217 or via communication interface 218 over network 112, among other possibilities. The checked-in indication received via communication interface 218 may take the form of (or include) a checked-in indication received from remote terminal 110 (or another remote terminal) via the communication interface, as just one example.

The checked-in indication may take the form of (or include) an indication that the personal mobility device S is checked in at a location other than locker 102. In such a case, locker 102 may instruct the personal mobility device S to autonomously drive to the locker, and locker 102 may receive personal mobility device S (autonomously driven to the locker) at the mobility device repository 212. In an embodiment, instructing personal mobility device S to autonomously drive to locker 102 includes making an autonomous drive determination based on a driving condition. The driving condition includes a driving distance from the first location to the locker, a route safety of a driving route from the first location to the locker, any other driving condition, or a combination of these, as examples. As another possibility, the checked-in indication may take the form of (or include) an indication that personal mobility device S is checked in at locker 102.

In some embodiments, locker 102 charges a battery of personal mobility device S (or another personal mobility device secured at mobility device repository 212 of the locker) using electrical system 214, perhaps based on a charge level of the personal mobility device determined by the locker as described above. In an embodiment, locker 102 charges the battery of personal mobility device S via an attachment point at which the personal mobility device is secured, such as attachment point 972 of mobility device rack 910 or an attachment point of conveyer 616 in enclosure 610. For instance, locker 102 may be electrically coupled to personal mobility device S via the attachment point upon securing the personal mobility device at the attachment point, and locker 102 may charge the battery of the personal mobility device via the electrical coupling.

Subsequent to securing personal mobility device S at mobility device repository 212, locker 102 may set a checkout status of the personal mobility device to "checked in"—for instance, if the checkout status of the personal mobility device was "checked out" when the personal mobility device was received at the mobility device repository.

Locker 102 may obtain an image of at least part of the locker via camera 220, and may provide the obtained image to a security system—for instance, to prevent theft of personal mobility devices secured at the mobility device repository. In an embodiment, the security system includes server computer 108 communicatively coupled to locker 102 over network 112, and providing the obtained image to the security system include sending the obtained image to the server computer over the network via communication interface 218. In another embodiment, the security system includes security module instructions that are stored in data storage 504 and that, when executed by processor 502, cause locker 102 to execute a security module. In such an embodiment, providing the obtained image to the security system includes providing the obtained image to the security module. The security module executed by locker 102 causes the locker to perform an image processing on the provided image for preventing theft of personal mobility devices secured at the mobility device repository. Additionally or alternatively, locker 102 may provide the obtained image to an inventory management system for confirming an inventory of the personal mobility devices secured at mobility device repository 212.

In some embodiments, locker 102 determines a status of the locker. Determining the status of locker 102 may include the locker determining a charge level of a battery of personal mobility device S or another personal mobility device secured at mobility device repository 212 of the locker. As another example, determining the status of locker 102 may include determining a maintenance status of personal mobility device S or another personal mobility device secured at mobility device repository 212 of the locker. The determination of the maintenance status may include determining whether maintenance is required on the personal mobility device before the personal mobility device is available for dispensing by locker 102. If personal mobility device S is secured at an attachment point of conveyer 616 in enclosure 610, and if the determined maintenance status of the personal mobility device is that maintenance is required, then locker 102 may remove the personal mobility device from the conveyer—for example, by moving the personal mobility device to a storage area (in the enclosure) for storing personal mobility devices that require maintenance prior to dispensing. Determining the maintenance status of personal mobility device S may include obtaining the status from the personal mobility device, obtaining the status via kiosk 216, or obtaining the status from remote terminal 110, as examples. Determining the status of locker 102 may take other forms as well.

Figure 10:
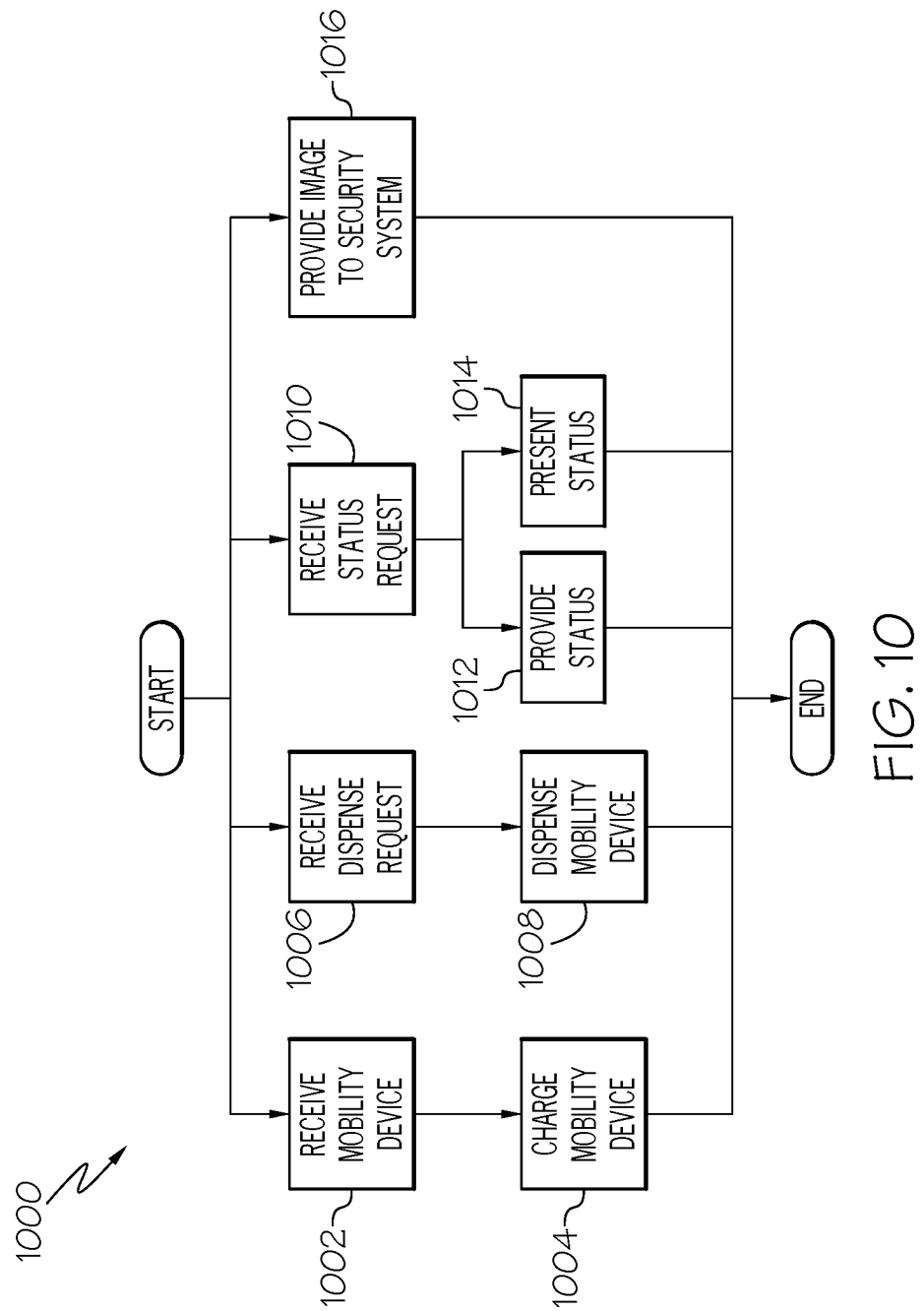
FIG. 10 depicts a flowchart of a method, according to one or more embodiments illustrated and described herein.

FIG. 10 depicts a flowchart of a method, according to one or more embodiments illustrated and described herein. As shown, a method 1000 begins at step 1002 with locker 102 receiving personal mobility device S at mobility device repository 212 and securing the received personal mobility device at the mobility device repository—for example, in the manner described above. At step 1004, locker 102 charges a battery of personal mobility device S (or another personal mobility device secured at mobility device repository 212 of the locker) using electrical system 214. An example of charging a personal mobility device is provided above.

At step 1006, locker 102 receives a request to dispense a personal mobility device—for instance, a personal mobility device secured at mobility device repository 212. As an example, the request to dispense the personal mobility device may be received via kiosk 216 (e.g., received via user interface 217 of the kiosk). As another example, the request to dispense the personal mobility device may be received from remote terminal 110 (e.g., received via communication interface 218 from remote terminal 110 over network 112).

At step 1008, in response to receiving the request to dispense a personal mobility device at step 1006, locker 102 dispenses personal mobility device S (or another personal mobility device) among one or more personal mobility devices secured at mobility device repository 212. In an embodiment, personal mobility device S is secured at an attachment point of conveyer 616 in enclosure 610, and dispensing personal mobility device S includes detaching the personal mobility device from the attachment point.

In an embodiment, dispensing personal mobility device S includes detaching the personal mobility device from an attachment point at dispensing end 622 of conveyer 616 in enclosure 610. If the attachment point is not at dispensing end 622, then locker 102 may advance the conveyer 616 (e.g., by advancing attachment points of the conveyer towards dispensing end 622 and away from receiving end 624 of the conveyer) until the attachment point is at the dispensing end, and may detach the personal mobility device from the attachment point advanced to dispensing end. Locker 102 provides the detached personal mobility device, from dispensing end 622 of conveyer 616, through discharge opening 614.

At step 1010, locker 102 receives a request for a status of the locker (sometimes referred to as a status request). In an embodiment, the status request is received from kiosk 216 (e.g., received via user interface 217 of the kiosk). In another embodiment, the status request is received from remote terminal 110 (e.g., received via communication interface 218 from the remote terminal over network 112). The status of the locker (referred to hereinafter as the locker status) comprises an availability of one or more personal mobility devices secured at mobility device repository 212 for dispensing from the mobility device repository.

At step 1012, in response to receiving a status request from remote terminal 110, locker 102 provides a locker status of the locker to remote terminal 110. As an example, in response to receiving the status request via communication interface 218 from remote terminal 110 over network 112), locker 102 provides the locker status via the communication interface to the remote terminal over the network. The provided locker status may include, for instance, a status of locker 102 as determined by the locker in the manner described above.

At step 1014, in response to receiving a status request via kiosk 216, locker 102 presents a status of the locker via the kiosk. For instance, in response to receiving a status request via user interface 217 of kiosk 216, locker 102 presents a status of the locker via the user interface device of the kiosk. The provided locker status may include a status of locker 102 as determined by the locker in the manner described above, among other possibilities. At step 1016, locker 102 obtains an image of at least part of the locker via camera 220, and provides the obtained image to a security system, examples of which are described above.

Those of skill in the art will appreciate that the respective steps of the method 1000 need not be carried out in the order described herein unless otherwise noted, but could be carried out in other ways as well. Method 1000 may be carried out by locker 102—for instance, by locker controller 222 and/or another component of locker 102—or the method may be carried out by another component (or combination of components) of system 100, such as locker 104 (among other possibilities).

It should now be understood that embodiments described herein are directed to mobility device sharing systems, mobility device lockers, and methods carried out by the systems and lockers. In some embodiments, a locker includes a mobility device repository, an electrical system, a kiosk having a user interface, a communication interface communicatively connected to a network, a processor, and a non-transitory computer readable storage medium. The mobility device repository is configured to secure one or more personal mobility devices at the mobility device repository. The electrical system is configured to receive electrical power from a power source and to charge respective batteries of the personal mobility devices secured at the mobility device repository using the received electrical power. The non-transitory computer readable storage medium comprises instructions that, when executed by the processor, cause the locker to receive a respective personal mobility device at the mobility device repository and secure the received personal mobility device at the mobility device repository, and to receive a checked-in indication that the respective personal mobility device is checked in. The checked-in indication is received via the user interface or via the communication interface over the network. The instructions further cause the locker to charge a respective battery of the received personal mobility device using the electrical system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A locker comprising a mobility device repository, a lift, an electrical system, a kiosk having a user interface, a communication interface communicatively connected to a network, a processor, and a non-transitory computer readable storage medium, wherein:
   the mobility device repository is configured to secure one or more personal mobility devices at the mobility device repository,
   the mobility device repository comprises an enclosure configured to secure the one or more personal mobility devices within the enclosure, the enclosure comprising:
      a receiving opening positioned on a first surface of the enclosure, and
      a conveyer within the enclosure configured to secure the one or more personal mobility devices within the enclosure,
   the lift configured to receive the respective personal mobility device at a ground surface, the lift movable along the first surface of the enclosure between the ground surface and the receiving opening,
   the mobility device repository further comprises a discharge opening positioned on a second surface of the enclosure opposite of the first surface, the discharge opening being positioned lower to the ground surface than the receiving opening, the conveyer having a dispensing end and a receiving end, the dispensing end for discharging a given personal mobility device from the conveyer and through the discharge opening, the receiving end for receiving a given personal mobility device through the receiving opening and onto the conveyer, the electrical system is configured to receive electrical power from a power source and to charge respective batteries of the personal mobility devices secured at the mobility device repository using the received electrical power, and the non-transitory computer readable storage medium comprises instructions that, when executed by the processor, cause the locker to:
 elevate the respective personal mobility device received at the lift to the receiving opening, and to transfer the elevated personal mobility device into the enclosure,
 receive the respective personal mobility device at the mobility device repository and secure the received personal mobility device at the mobility device repository;
 receive a checked-in indication that the respective personal mobility device is checked in, wherein the checked-in indication is received via the user interface or via the communication interface over the network; and
 charge a respective battery of the received personal mobility device using the electrical system.

2. The locker of claim 1, wherein:
the mobility device repository further comprises an attachment surface configured to attach the mobility device repository to a wall extending perpendicularly from the ground surface such that the mobility device repository extends from the wall, and
the first surface of the enclosure is a surface other than the attachment surface of the locker.

3. The locker of claim 1, wherein:
the checked-in indication comprises an indication that the respective personal mobility device is checked in at a first location other than the locker, and
the instructions to receive the respective personal mobility device at the mobility device repository comprise instructions that cause the locker to:
 instruct the respective personal mobility device to autonomously drive to the locker; and
 receive, at the mobility device repository, the respective personal mobility device autonomously driven to the locker.

4. The locker of claim 3, wherein the instructions to instruct the respective personal mobility device to autonomously drive to the locker comprise instructions that cause the locker to:
 make an autonomous drive determination based on a driving condition, the driving condition comprising at least one of a driving distance from the first location to the locker and a route safety of a driving route from the first location to the locker; and
 in response to making the autonomous drive determination, instruct the respective personal mobility device to autonomously drive to the locker.

5. The locker of claim 1, wherein the locker further comprises a camera and the instructions further cause the locker to:
 obtain an image of at least part of the locker via the camera;
 provide the obtained image to a security system for preventing theft of the personal mobility devices secured at the mobility device repository; and
 provide the obtained image to an inventory management system for confirming an inventory of the personal mobility devices secured at the mobility device repository.

6. The locker of claim 1, wherein:
a locker awning covers at least part of the locker, the locker awning comprising a solar panel configured to generate electrical power from sunlight received at the solar panel, and
the electrical system is configured to receive the generated electrical power from the solar panel.

7. A method comprising:
receiving a respective personal mobility device at a mobility device repository of a locker and securing the received personal mobility device at the mobility device repository, wherein receiving the respective personal mobility device at the mobility device repository comprises:
 instructing the respective personal mobility device to autonomously drive to the locker; and
 receiving, at the mobility device repository, the respective personal mobility device autonomously driven to the locker;
receiving a checked-in indication that the respective personal mobility device is checked in, the locker including a kiosk having a user interface and further including a communication interface communicatively connected to a network, wherein the checked-in indication is received via the user interface or via the communication interface over the network and the checked-in indication comprises an indication that the respective personal mobility device is checked in at a first location other than the locker; and
charging a respective battery of the received personal mobility device using an electrical system of the locker.

8. The method of claim 7, wherein:
the mobility device repository comprises an enclosure configured to secure one or more personal mobility devices within the enclosure, the enclosure comprising a receiving opening positioned on a first surface of the enclosure,
the locker further comprises a lift configured to receive the respective personal mobility device at a ground surface, the lift movable along the first surface of the enclosure between the ground surface and the receiving opening, and
the method further comprises:
 elevating the respective personal mobility device received at the lift to the receiving opening, and transferring the elevated personal mobility devices into the enclosure.

9. The method of claim 7, wherein instructing the respective personal mobility device to autonomously drive to the locker comprises:
 making an autonomous drive determination based on a driving condition, the driving condition comprising at least one of a driving distance from the first location to the locker and a route safety of a driving route from the first location to the locker; and
 in response to making the autonomous drive determination, instructing the respective personal mobility device to autonomously drive to the locker.

10. The method of claim 7, wherein the locker further comprises a camera, the method further comprising:
obtaining an image of at least part of the locker via the camera;
providing the obtained image to a security system for preventing theft of the personal mobility devices secured at the mobility device repository; and
providing the obtained image to an inventory management system for confirming an inventory of the personal mobility devices secured at the mobility device repository.

11. A locker comprising a mobility device repository, a lift, an electrical system, a kiosk having a user interface, a communication interface communicatively connected to a network, a processor, and a non-transitory computer readable storage medium, wherein:
the mobility device repository comprises an enclosure configured to secure one or more personal mobility devices at the mobility device repository within the enclosure, the enclosure comprising a receiving opening positioned on a first surface of the enclosure,
the lift is configured to receive the respective personal mobility device at a ground surface, the lift movable along the first surface of the enclosure between the ground surface and the receiving opening,
the electrical system is configured to receive electrical power from a power source and to charge respective batteries of the personal mobility devices secured at the mobility device repository using the received electrical power, and
the non-transitory computer readable storage medium comprises instructions that, when executed by the processor, cause the locker to:
receive a checked-in indication that a respective personal mobility device is checked in at a first location other than the locker, wherein the checked-in indication is received via the user interface or via the communication interface over the network;
in response to receiving the checked-in indication, instruct the respective personal mobility device to autonomously drive to the locker;
receive, at the lift, the respective personal mobility device autonomously driven to the locker, and elevate the respective personal mobility device received at the lift from the ground surface to the receiving opening;
transfer the elevated personal mobility devices from the lift into the enclosure, and secure the received personal mobility device at the mobility device repository within the enclosure;
charge a respective battery of the received personal mobility device using the electrical system.

12. The locker of claim 11, wherein:
the mobility device repository further comprises an attachment surface configured to attach the mobility device repository to a wall extending perpendicularly from the ground surface such that the mobility device repository extends from the wall, and
the first surface of the enclosure is a surface other than the attachment surface of the locker.

13. The locker of claim 11, wherein:
the mobility device repository further comprises a discharge opening positioned on a second surface of the enclosure opposite of the first surface, the discharge opening being positioned lower to the ground surface than the receiving opening, and
a conveyer within the enclosure configured to secure the one or more personal mobility devices within the enclosure, the conveyer having a dispensing end and a receiving end, the dispensing end for discharging a given personal mobility device from the conveyer and through the discharge opening, the receiving end for receiving a given personal mobility device through the receiving opening and onto the conveyer.

14. The locker of claim 11, wherein the instructions to instruct the respective personal mobility device to autonomously drive to the locker comprise instructions that cause the locker to:
make an autonomous drive determination based on a driving condition, the driving condition comprising at least one of a driving distance from the first location to the locker and a route safety of a driving route from the first location to the locker; and
in response to making the autonomous drive determination, instruct the respective personal mobility device to autonomously drive to the locker.

15. The locker of claim 11, wherein the locker further comprises a camera and the instructions further cause the locker to:
obtain an image of at least part of the locker via the camera; and
provide the obtained image to a security system for preventing theft of the personal mobility devices secured at the mobility device repository.

16. The locker of claim 11, wherein the locker further comprises a camera and the instructions further cause the locker to:
obtain an image of at least part of the locker via the camera; and
provide the obtained image to an inventory management system for confirming an inventory of the personal mobility devices secured at the mobility device repository.

17. The locker of claim 11, wherein:
a locker awning covers at least part of the locker, the locker awning comprising a solar panel configured to generate electrical power from sunlight received at the solar panel, and
the electrical system is configured to receive the generated electrical power from the solar panel.

* * * * *